US011209966B2

(12) United States Patent
Drake et al.

(10) Patent No.: US 11,209,966 B2
(45) Date of Patent: Dec. 28, 2021

(54) EXTENDED ON-SCREEN GAMEPLAY VIA AUGMENTED REALITY

(71) Applicant: DISNEY ENTERPRISES, INC., Burbank, CA (US)

(72) Inventors: Corey Drake, Sunland, CA (US); Elliot Baumbach, Porter Ranch, CA (US); Jonathan R. Hsu, Pomona, CA (US); Tritia V. Medrano, Rowland Heights, CA (US); Nathan Nocon, Valencia, CA (US); Timothy M. Panec, Studio City, CA (US); Clifford W. Wong, Burbank, CA (US); Jason Yeung, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/257,047

(22) Filed: Jan. 24, 2019

(65) Prior Publication Data
US 2020/0241733 A1 Jul. 30, 2020

(51) Int. Cl.
G02B 27/01 (2006.01)
G06F 3/0484 (2013.01)
G06F 3/14 (2006.01)
G06T 19/00 (2011.01)

(52) U.S. Cl.
CPC ....... G06F 3/04842 (2013.01); G02B 27/017 (2013.01); G06F 3/1454 (2013.01); G06T 19/006 (2013.01)

(58) Field of Classification Search
CPC . G06F 3/04842; G06F 3/1454; G02B 27/017; G06T 19/006
See application file for complete search history.

(56) References Cited

U.S. PATENT DOCUMENTS

| 10,078,917 | B1 * | 9/2018 | Gaeta | G06T 15/503 |
| 2012/0249741 | A1 * | 10/2012 | Maciocci | G06T 15/503 |
| | | | | 348/46 |
| 2013/0010052 | A1 * | 1/2013 | Ihara | H04N 7/15 |
| | | | | 348/14.07 |
| 2019/0369713 | A1 * | 12/2019 | Suzuki | G06F 3/017 |
| 2020/0168177 | A1 * | 5/2020 | Lee | G06F 3/04842 |

* cited by examiner

Primary Examiner — Samantha (Yuehan) Wang
(74) Attorney, Agent, or Firm — Artegis Law Group, LLP

(57) ABSTRACT

Various embodiments of the invention disclosed herein provide techniques for extending on-screen gameplay via an augmented reality (AR) system. An extended AR application executing on an AR headset system receives, via a game controller, first data associated with a first object associated with a computer-generated game. The extended AR application renders an augmented reality object based on the first data associated with the first object. The extended AR application displays at least a first portion of the augmented reality object via an augmented reality headset system. Further, an image associated with the computer-generated game is simultaneously rendered on a display monitor.

20 Claims, 13 Drawing Sheets

EXTENDED ON-SCREEN GAMEPLAY VIA AUGMENTED REALITY

BACKGROUND OF THE INVENTION

Field of the Invention

The present invention relates generally to augmented reality technology and, more specifically, to extended on-screen gameplay via augmented reality.

Description of the Related Art

Computer-based gameplay has become a widely popular form of personal entertainment. During a typical computer-based game, a user views computer-generated images on a display monitor and manipulates controls on a game controller to achieve certain game-related results. For example, the user could manipulate the controls on a game controller to move a character through various challenges and solve puzzles, to fire weapons on a virtual intruder, or to retrieve certain objects for later use during the game. As a general matter, gameplay usually is confined to the bounds of the display monitor, meaning that the images rendered by the game are restricted in size so that those images can be displayed within the horizontal and vertical boundaries of the display monitor. Consequently, an immersive user experience is oftentimes not achievable because gameplay is only in the context of the bounded two-dimensional region defined by the display monitor.

Some gaming systems are virtual reality (VR)-based and, accordingly, are not necessarily restricted to the boundaries of a display monitor. In a VR system, a user experiences an artificial three-dimensional (3D) environment generated by a game, where the user views the VR environment via a VR display apparatus, such as VR glasses or a VR headset. During gameplay, the user proceeds through the game as if the user were present within the 3D environment. While new and interesting from a sensory perspective, VR-based gaming systems lack the familiarity and engagement of gameplay via a display monitor with which users are familiar. To address this drawback, a VR-based gaming system can generate a virtual display screen within the VR environment, which allows the user to play the game within the VR environment. However, gameplay is confined to the bounds of the virtual screen in the VR environment. Therefore, the images generated by the game are still restricted in size so that those images can be displayed within the horizontal and vertical boundaries of the virtual screen. As a result, the immersive user experience of VR is oftentimes not realized when a display-based computer game is played via a VR system.

As the foregoing illustrates, what is needed in the art are more effective techniques for generating more immersive environments when playing computer-generated games.

SUMMARY OF THE INVENTION

Various embodiments of the invention disclosed herein provide a method for extending on-screen gameplay via an augmented reality system. The method includes receiving, via a game controller, first data associated with a first object associated with a computer-generated game. The method further includes rendering an augmented reality object based on the first data associated with the first object. The method further includes displaying at least a first portion of the augmented reality object via an augmented reality headset system. In addition, an image associated with the computer-generated game is simultaneously rendered on a display monitor.

Other embodiments of the present invention include, without limitation, a computer-readable medium including instructions for performing one or more aspects of the disclosed techniques, as well as a computing device and system for performing one or more aspects of the disclosed techniques.

At least one advantage of the disclosed techniques relative to the prior art is that a user experiences more realistic computer-generated gameplay because objects are displayed via traditional display monitor and additional 2D and 3D AR objects are displayed via a companion AR system. As a result, the user can have a more immersive overall experience with enhanced effects, such as the effect of objects displayed via the traditional display monitor appearing to come out of the display monitor into the physical environment of the user. Similarly, the AR objects displayed via the AR system and in the physical environment of the user can appear to enter into the display monitor. In effect, the user is able to play the computer game on the traditional display monitor as well as in the physical environment where the user is physically present, thereby creating a more fully immersive gameplay experience relative to the prior art. These advantages represent one or more technological improvements over prior art approaches.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that embodiments of the present invention may be practiced without one or more of these specific details.

System Overview

Figure 1:
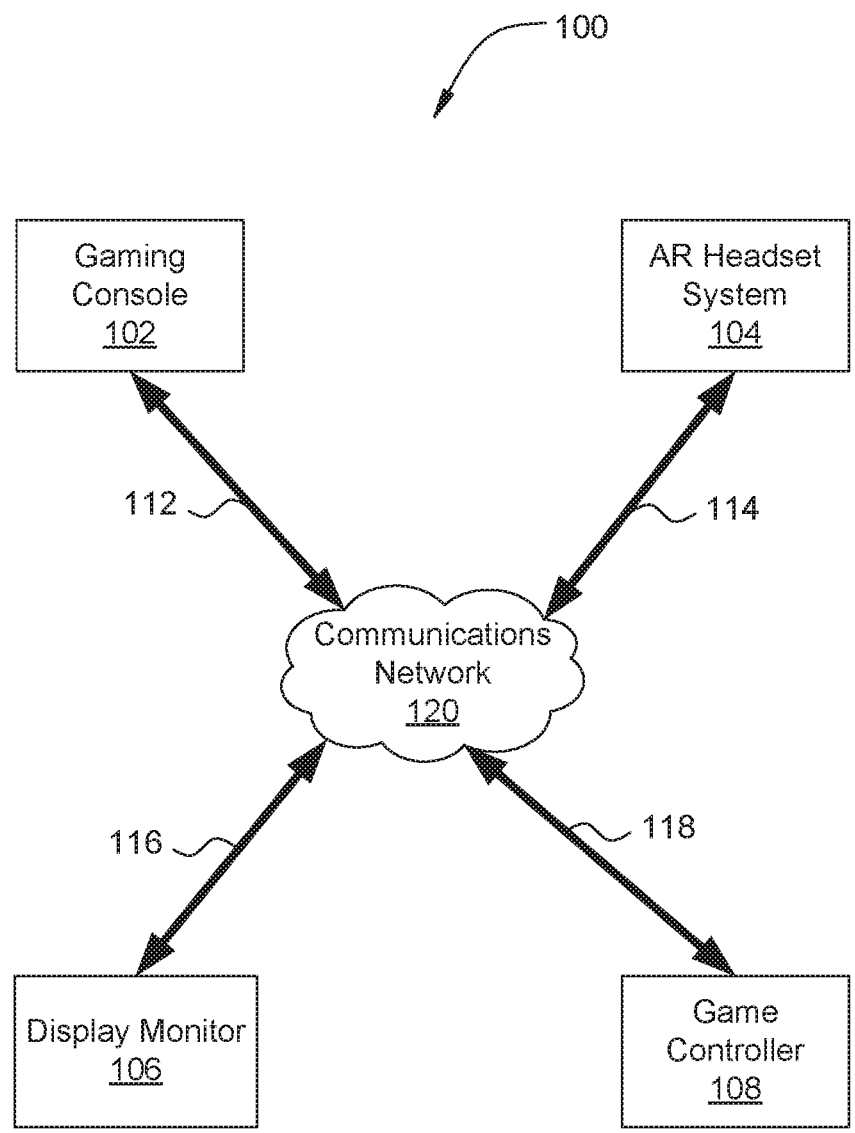
FIG. 1 illustrates a system configured to implement one or more aspects of the present invention.

FIG. 1 illustrates a system 100 configured to implement one or more aspects of the present invention. As shown, the system includes, without limitation, a gaming console 102, an AR headset system 104, a display monitor 106, and a game controller 108 in communication with each other via a computer network 120. Computer network 120 may be any suitable environment to enable communications among remote or local computer systems and computing devices, including, without limitation, point-to-point communications channels, Bluetooth, WiFi, infrared communications, wireless and wired LANs (Local Area Networks), and one or more internet-based WANs (Wide Area Networks).

Gaming console 102, includes, without limitation, a computing device that may be a standalone server, a cluster or "farm" of servers, one or more network appliances, or any other device suitable for implementing one or more aspects of the present invention. Illustratively, gaming console 102 communicates over computer network 120 via communications link 112.

In operation, gaming console 102 executes an extended gaming application to control various aspects of gameplay. Gaming console 102 receives control inputs from AR headset system 104 related to tracking data. The tracking data includes the position and/or orientation of the AR headset system 104. Additionally or alternatively, the tracking data includes the position and/or orientation of one or more objects detected by AR headset system 104.

Similarly, gaming console 102 receives control inputs from game controller 108. The control inputs include, without limitation, button presses, trigger activations, and tracking data associated with game controller 108. The tracking data may include the location and/or orientation of the game controller 108. Game controller 108 transmits control inputs to gaming console 102. In this manner, gaming console 102 determines which controls of game controller 108 are active. Further, gaming console 102 tracks the location and orientation of the game controller 108.

AR headset system 104 includes, without limitation, a computing device that may be a personal computer, personal digital assistant, mobile phone, mobile device, or any other device suitable for implementing one or more aspects of the present invention. In some embodiments, AR headset system 104 may include an embedded computing system that is integrated within augmented reality goggles, augmented reality glasses, heads-up display (HUD), handheld device, or any other technically feasible AR viewing device. Illustratively, AR headset system 104 communicates over network 120 via communications link 114.

In operation, AR headset system 104 transmits tracking data to gaming console 102. The tracking data may include the location and/or orientation of the AR headset system 104. AR headset system 104 transmits the location and orientation of AR headset system 104 to gaming console 102. In this manner, gaming console 102 tracks the location and orientation of the head of the user.

Additionally or alternatively, the tracking data may include location and/or orientation of objects detected by the AR headset system 104. As one example, AR headset system 104 could include a camera and a mechanism for tracking objects visible in images captured by the camera. AR headset system 104 could detect when the hands of the user are included in the image captured by the camera. AR headset system 104 could then determine the location and orientation of the hands of the user. AR headset system 104 would then transmit the location and orientation of the hands of the user to gaming console 102.

AR headset system 104 receives location and/or orientation data from gaming console 102 regarding objects to display as AR objects. In response, AR headset system 104 renders and displays the AR objects. In this manner, the user sees the AR objects in 3D space in addition to seeing the images rendered by gaming console 102 and displayed on display monitor 106.

Display monitor 106 includes, without limitation, any conventional display device such as a cathode ray tube, liquid crystal display, light-emitting diode display, or the like. Display monitor 106 includes a computing device that may be an embedded processor, a personal computer, personal digital assistant, mobile phone, mobile device, or any other device suitable for implementing one or more aspects of the present invention. Illustratively, display monitor 106 communicates over network 120 via communications link 116. In operation, display monitor 106 receives image data from gaming console 102, and displays the image data on the display device. Additionally or alternatively, display monitor 106 receives image data from AR headset system 104, and displays the image data on the display device.

Game controller 108 is a device that includes one or more controls that may be activated by a user. Such controls include, without limitation, buttons, a joystick, a "weapon" that may be aimed and fired, and steering mechanism. Illustratively, game controller 108 communicates over computer network 120 via communications link 118. In operation, game controller 108 detects when one or more controls are activated, such as when a button is pushed, a joystick is moved, or a weapon is aimed and fired. Game controller 108 converts the detected activations into electronic data and transmits the electronic data to one or both of gaming console 102 and AR headset system 104 over communications channel 118.

It will be appreciated that the system shown herein is illustrative and that variations and modifications are possible. In one example, although the system 100 of FIG. 1 is illustrated with one gaming console 102, one AR headset system 104, one VR/AR headset 106, one display monitor 106, and one game controller 108, the system 100 could include any technically feasible number of gaming consoles 102, AR headset systems 104, VR/AR headsets 106, display monitors 106, and game controllers 108 within the scope of the present disclosure. In another example, the techniques are disclosed as being executed in part on gaming console 102 and in part on AR headset system 104. However, the disclosed techniques could be performed entire on gaming console 102 and/or entirely on AR headset system 104 within the scope of the present disclosure.

In yet another example, the techniques are disclosed herein in the context of computer gaming environments. However, the disclosed techniques could be employed in any technically feasible environment within the scope of the present disclosure. The disclosed techniques could be employed in teleconferencing applications where individual or multi-person groups, such as a group convened in a corporate conference room, communicate and/or collaboratively work with each other. Additionally or alternatively, the disclosed techniques could be employed in scenarios where a user engages in an interactive meeting with a physician or other professional. Additionally or alternatively, the disclosed techniques could be employed in collaborative work scenarios where a single user, multiple users, and/or groups of users review and edit various documents that appear on a display monitor 106 and/or in 3D space as AR objects rendered and displayed by AR headset system 104. Any or all of these embodiments are within the scope of the present disclosure, in any technically feasible combination.

In some embodiments, multiple users access one or more systems, such as system 100. For example, a first user and a second user could each access a different system 100 to execute a remote multiplayer game. A first user could access a first system 100 that scans and analyzes a physical environment associated with the first user. Similarly, a second user could access a second system 100 that scans and analyzes a physical environment associated with the second user. The system 100 associated with the first user could exchange this physical environment data with the system 100 associated with the second user. Consequently, when the first user and/or the second user enter a common area of a virtual map associated with the remote multiplayer game, the first user could view a representation of the physical environment of the second user on the display monitor 106 associated with the first user. Likewise, the second user could view a representation of the physical environment of the first user on the display monitor 106 associated with the second user. In this manner, the first user and the second user sees a virtual viewport into the physical environment of the other user. Further, either user could "enter" the representation of the physical environment of the other user, such that the first user and the second user appear to occupy the same virtual space, even though the first user and the second user are physically remote from one another.

In some embodiments, a user associated with the system 100 may employ a wearable computing device, such as a smartwatch. In such embodiments, the display of the wearable computing device may replace and/or augment the display of display monitor 106. Similarly, the tracking data and/or other controls of the wearable computing device may replace and/or augment the tracking data and/or other controls associated with AR headset system 104 and/or game controller 108. In this manner, such a wearable computing device may be capable to perform any or all of the techniques disclosed herein.

Techniques for rendering and displaying 2D and 3D AR objects as part of an immersive computer gaming experience are now described in greater detail below in conjunction with FIGS. 2-9C.

Extended On-Screen Gameplay Via Augmented Reality

Figure 2:
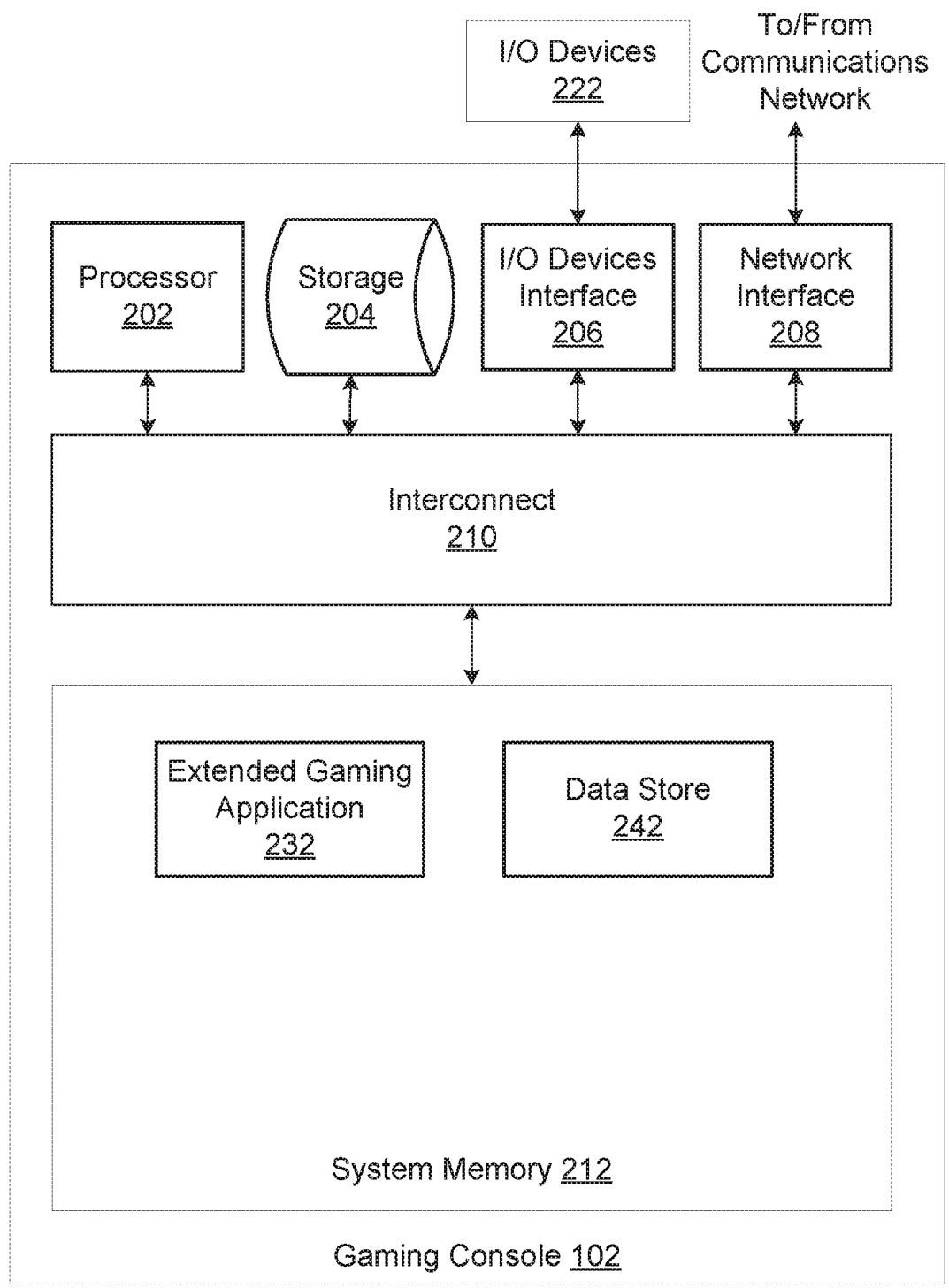
FIG. 2 is a more detailed illustration of the gaming console of FIG. 1, according to various embodiments of the present invention.

FIG. 2 is a more detailed illustration of the gaming console 102 of FIG. 1, according to various embodiments of the present invention. As shown in gaming console 102 includes, without limitation, a central processing unit (CPU) 202, storage 204, an input/output (I/O) devices interface 206, a network interface 208, an interconnect 210, and a system memory 212.

The processor 202 retrieves and executes programming instructions stored in the system memory 212. Similarly, the processor 202 stores and retrieves application data residing in the system memory 212. The interconnect 210 facilitates transmission, such as of programming instructions and application data, between the processor 202, input/output (I/O) devices interface 206, storage 204, network interface 208, and system memory 212. The I/O devices interface 206 is configured to receive input data from user I/O devices 222. Examples of user I/O devices 222 may include one of more buttons, a keyboard, and a mouse or other pointing device. The I/O devices interface 206 may also include an audio output unit configured to generate an electrical audio output signal, and user I/O devices 222 may further include a speaker configured to generate an acoustic output in response to the electrical audio output signal. Another example of a user I/O device 222 is a display device that generally represents any technically feasible means for generating an image for display. For example, the display device could be a liquid crystal display (LCD) display, CRT display, or DLP display. The display device may be a TV that includes a broadcast or cable tuner for receiving digital or analog television signals.

Processor 202 is included to be representative of a single CPU, multiple CPUs, a single CPU having multiple processing cores, and the like. And the system memory 212 is generally included to be representative of a random access memory. The storage 204 may be a disk drive storage device. Although shown as a single unit, the storage 204 may be a combination of fixed and/or removable storage devices, such as fixed disc drives, floppy disc drives, tape drives, removable memory cards, or optical storage, network attached storage (NAS), or a storage area-network (SAN). Processor 202 communicates to other computing devices and systems via network interface 208, where network interface 208 is configured to transmit and receive data via a communications network.

The system memory 212 includes, without limitation, an extended gaming application 232 and a data store 242. Extended gaming application 232, when executed by the processor 202, performs one or more operations associated with gaming console of FIG. 1, as further described herein. Data store 242 provides memory storage for various items of 2D and 3D gaming content, as further described herein. Extended gaming application 232 stores data in and retrieves data from data store 242, as further described herein.

In operation, extended gaming application 232 controls various aspects of gameplay for a particular on-screen computer game. Extended gaming application 232 receives control inputs from AR headset system 104 related to tracking data. The tracking data includes the position and/or orientation of the AR headset system 104. Additionally or alternatively, the tracking data includes the position and/or orientation of one or more objects detected by AR headset system 104.

Similarly, extended gaming application 232 receives control inputs from game controller 108. The control inputs include, without limitation, button presses, trigger activations, and tracking data associated with game controller 108. The tracking data may include the location and/or orientation of the game controller 108. Game controller 108 transmits control inputs to extended gaming application 232. In this manner, extended gaming application 232 determines which controls of game controller 108 are active. Further, extended gaming application 232 tracks the location and orientation of the game controller 108.

Extended gaming application 232 proceeds through gameplay based on events within the executing game, control inputs received from AR headset system 104, and control inputs received from game controller 108. Extended gaming application 232 detects when an object being displayed on display monitor 106 is transitioning from the bounds of the display monitor 106 and about to enter the 3D space outside of the display monitor 106. In response, extended gaming application 232 transmits position data, orientation data, and other related information to AR headset system 104. Extended gaming application 232 removes the object from being displayed on display monitor 106. In response to receiving position data, orientation data, and other related information from extended gaming application 232, AR headset system 104 renders and displays the AR objects. In this manner, the user sees the AR objects in 3D space in addition to seeing the images rendered by extended gaming application 232 and displayed on display monitor 106.

Similarly, extended gaming application 232 detects when an object being displayed as an AR object by AR headset system 104 is transitioning from 3D space to enter into the bounds of the display monitor 106. In response, extended gaming application 232 transmits position data, orientation data, and other related information to AR headset system 104. In response, AR headset system 104 ends the rendering and displaying the AR object. Extended gaming application 232 then renders and displays the object display monitor 106.

When exiting or entering the bound of the display monitor 106, an object may undergo a transition phase, where a portion of the object is rendered and displayed on display monitor 106 and a portion of the object is rendered and display as an AR object in 3D space. During the transition phase, extended gaming application 232 determines a first portion of the object that is to be displayed on display monitor 106. Extended gaming application 232 renders and displays the first portion of the object on display monitor 106. Similarly, extended gaming application 232 determines a second portion of the object that is to be displayed on as an AR object. Extended gaming application 232 transmits position data, orientation data, and other information related to the second portion of the object to AR headset system 104. In response to receiving position data, orientation data, and other related information from extended gaming application 232, AR headset system 104 renders and displays the second portion of the object as an AR object.

Figure 3:
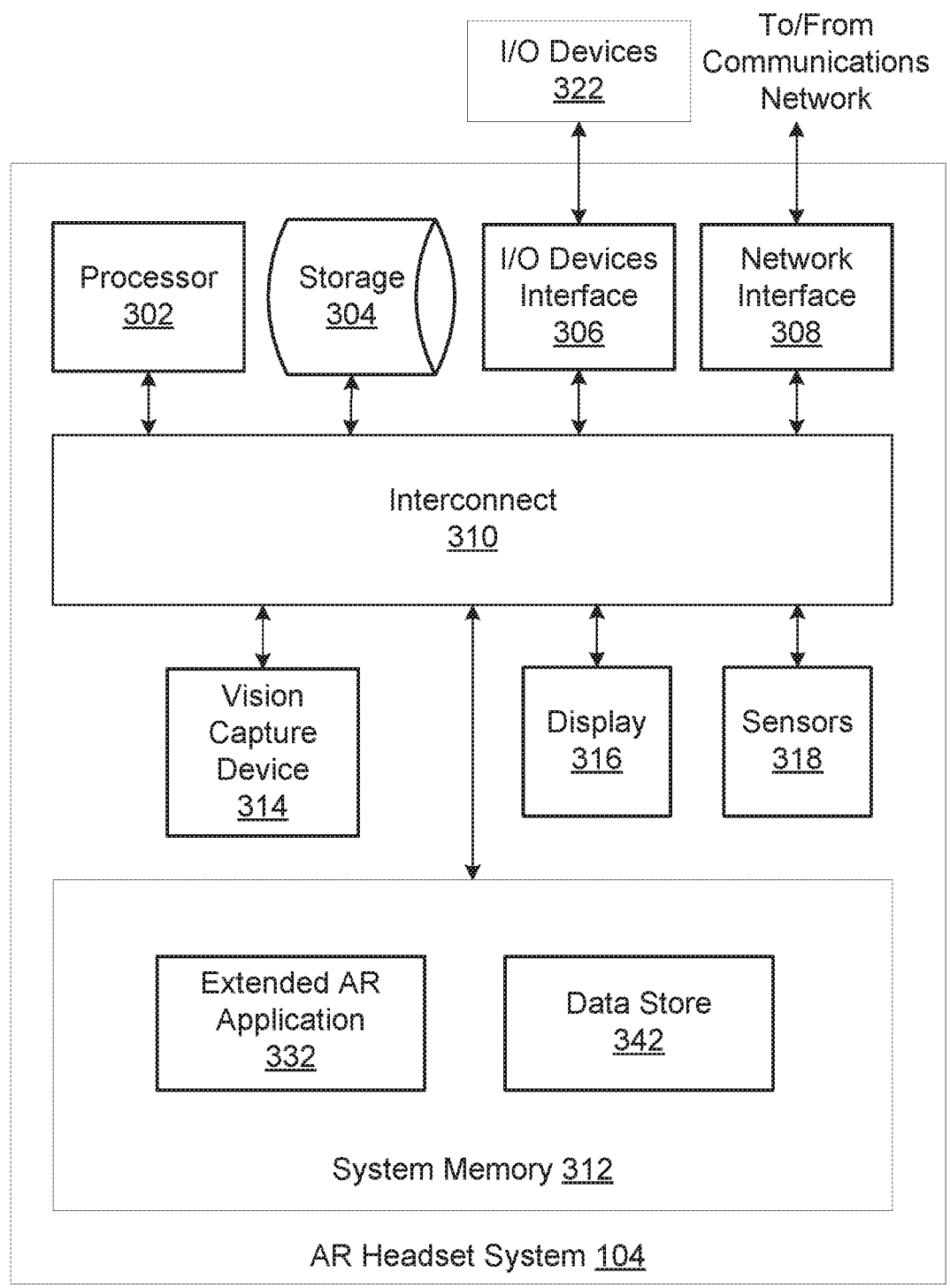
FIG. 3 is a more detailed illustration of the AR headset system of FIG. 1, according to various embodiments of the present invention.

FIG. 3 is a more detailed illustration of the AR headset system 104 of FIG. 1, according to various embodiments of the present invention. As shown in AR headset system 104 includes, without limitation, a central processing unit (CPU) 302, storage 304, an input/output (I/O) devices interface 306, a network interface 308, an interconnect 310, a system memory 312, a vision capture device 314, a display 316, and sensors 318.

The processor 302 retrieves and executes programming instructions stored in the system memory 312. Similarly, the processor 302 stores and retrieves application data residing in the system memory 312. The interconnect 310 facilitates transmission, such as of programming instructions and application data, between the processor 302, input/output (I/O) devices interface 306, storage 304, network interface 308, system memory 312, vision capture device 314, display 316, and sensors 318. The I/O devices interface 306 is configured to receive input data from user I/O devices 322. Examples of user I/O devices 322 may include one of more buttons, a keyboard, and a mouse or other pointing device. The I/O devices interface 306 may also include an audio output unit configured to generate an electrical audio output signal, and user I/O devices 322 may further include a speaker configured to generate an acoustic output in response to the electrical audio output signal. Another example of a user I/O device 322 is a display device that generally represents any technically feasible means for generating an image for display. For example, the display device could be a liquid crystal display (LCD), light emitting diode (LED) display, CRT display, or DLP display. The display device may be a TV that includes a broadcast or cable tuner for receiving digital or analog television signals.

The vision capture device 314 includes one or more cameras to capture images from the physical environment for analysis, processing, and display. In operation, the vision capture device 314 captures and transmits vision information to any one or more other elements included in the AR headset system 104. In some embodiments, the vision capture device 314 provides support for various vision-related functions, including, without limitation, image recognition, visual inertial odometry, and simultaneous locating and mapping.

The display 316 includes one or more display devices for displaying AR objects and other AR content. The display may be embedded into a head-mounted display (HMD) system that is integrated into the AR headset system 104. The display 316 reflects, overlays, and/or generates an image including one or more AR objects into or onto the physical environment via an LCD display, LED display, projector, or any other technically feasible display technology. The display 316 may employ any technically feasible approach to integrate AR objects into the physical environment, including, without limitation, pass-thru, waveguide, and screen-mirror optics approaches.

The sensors 318 include one or more devices to acquire location and orientation data associated with the AR headset system 104. The sensors 318 may employ any technically feasible approach to acquire location and orientation data, including, without limitation, gravity-sensing approaches and magnetic-field-sensing approaches. In that regard, the sensors 318 may include any one or more accelerometers, gyroscopes, magnetometers, and/or any other technically feasible devices for acquiring location and orientation data. The location and orientation data acquired by sensors 318 may be supplemental to or as an alternative to camera orientation data, e.g. yaw, pitch, and roll data, generated by the vision capture device 314.

Processor 302 is included to be representative of a single CPU, multiple CPUs, a single CPU having multiple processing cores, and the like. And the system memory 312 is generally included to be representative of a random access memory. The storage 304 may be a disk drive storage device. Although shown as a single unit, the storage 304 may be a combination of fixed and/or removable storage devices, such as fixed disc drives, floppy disc drives, tape drives, removable memory cards, or optical storage, network attached storage (NAS), or a storage area-network (SAN). Processor 302 communicates to other computing devices and systems via network interface 308, where network interface 308 is configured to transmit and receive data via a communications network.

The system memory 312 includes, without limitation, an extended AR application 332 and a data store 342. Extended AR application 332, when executed by the processor 302, performs one or more operations associated with gaming console of FIG. 1, as further described herein. Data store 342 provides memory storage for various items of 2D and 3D gaming content, as further described herein. Extended AR application 332 stores data in and retrieves data from data store 342, as further described herein In operation, extended AR application 332 transmits tracking data to gaming console 102. The tracking data may include the location and/or orientation of the AR headset system 104. Extended AR application 332 transmits the location and orientation of AR headset system 104 to gaming console 102. In this manner, gaming console 102 tracks the location and orientation of the head of the user.

Additionally or alternatively, extended AR application 332 transmits the location and/or orientation of objects detected by the extended AR application 332. As one example, AR headset system 104 could include a camera and a mechanism for tracking objects visible in images captured by the camera. Extended AR application 332 could detect when the hands of the user are included in the image captured by the camera. Extended AR application 332 could then determine the location and orientation of the hands of the user. Extended AR application 332 would then transmit the location and orientation of the hands of the user to gaming console 102.

Further, extended AR application 332 receives position data, orientation data, and other related information from gaming console 102 regarding objects transitioning from being displayed on display monitor to being displayed as an AR object. In response to receiving such position data, orientation data, and other related information, extended AR application 332 renders and displays the AR objects. Similarly, extended AR application 332 receives position data, orientation data, and other related information from gaming console 102 regarding objects transitioning from being displayed as an AR object to being displayed on display monitor. In response to receiving such position data, orientation data, and other related information, extended AR application 332 ends the rendering and displaying the AR object. In this manner, the user sees the AR objects rendered by extended AR application 332 in 3D space in addition to seeing the images rendered by extended gaming application 232 and displayed on display monitor 106.

When exiting or entering the bound of the display monitor 106, an object may undergo a transition phase, where a portion of the object is rendered and displayed on display monitor 106 and a portion of the object is rendered and display as an AR object in 3D space. During the transition phase, extended AR application 332 receives position data, orientation data, and other related information from gaming console 102 regarding the portion of the object that is to be rendered and displayed as an AR object. In response to receiving such position data, orientation data, and other related information, extended AR application 332 renders and displays the portion of the object to be display as an AR object.

Figure 4:
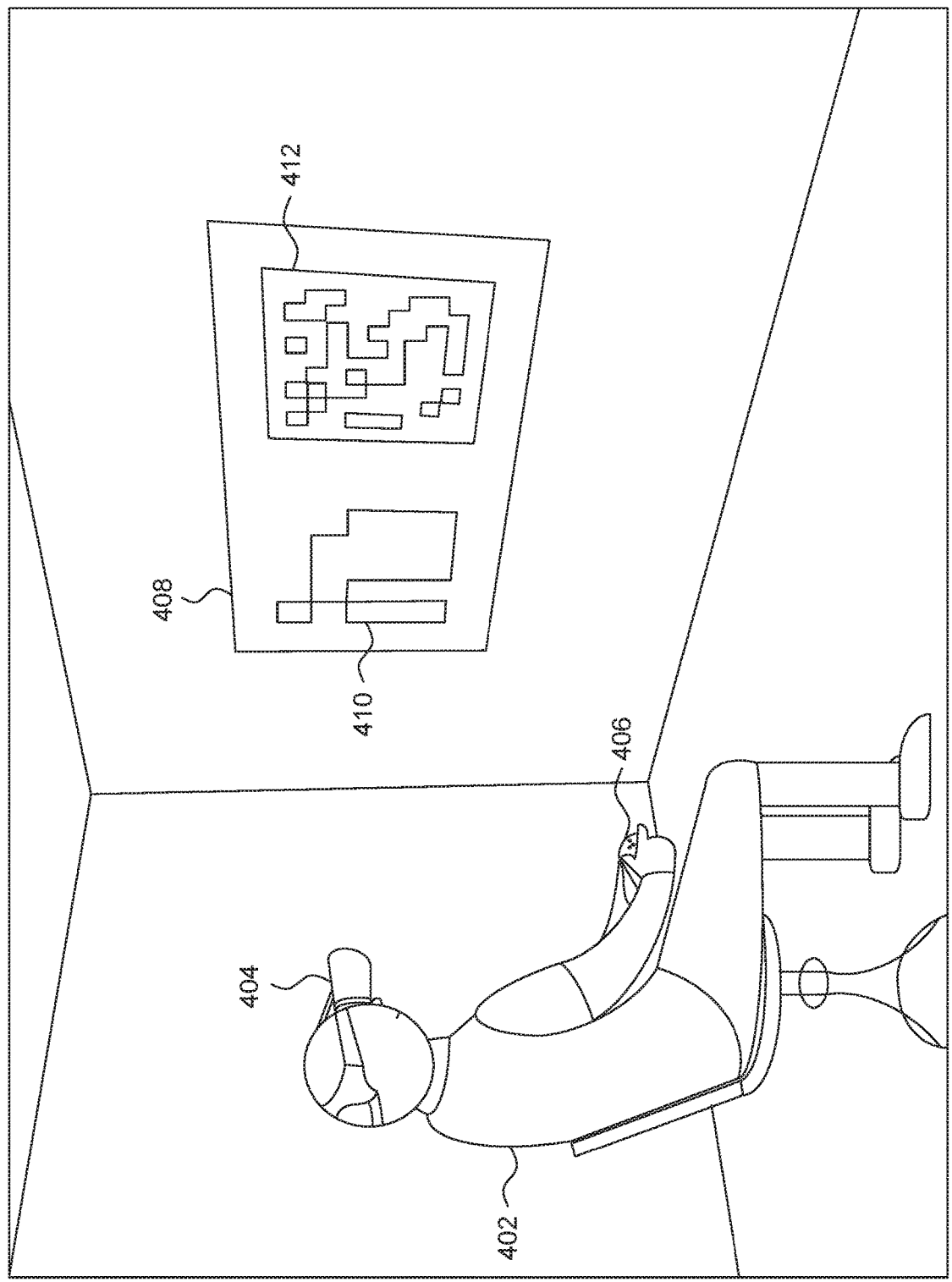
FIG. 4 illustrates an exemplary calibration process for the system of FIG. 1, according to various embodiments of the present invention.

FIG. 4 illustrates an exemplary calibration process for the system 100 of FIG. 1, according to various embodiments of the present invention. As shown, a user 402 views a display monitor 408 while wearing an AR headset system 404 and holding a game controller 406. The display monitor 408 displays two calibration glyphs 410 and 412.

Gaming console 102 displays calibration glyphs 410 and 412 prior to gameplay to perform initial calibration of the system 100. The user views calibration glyphs 410 and 412 via AR headset system 404. AR headset system 404 transmits position and/or orientation data of calibration glyphs 410 and 412 to gaming console 102. Gaming console 102 accesses data regarding the physical screen size of display monitor 408 as well as the original size of calibration glyphs 410 and 412. In some embodiments, the physical screen size of display monitor 408, the original size of calibration glyphs 410 and 412, and other related information may be encoded as data in calibration glyphs 410 and 412. The data could be included in calibration glyphs 410 and 412 as QR codes (as shown) or in any other technically feasible encoding format. Based on this data, and on the position and/or orientation data of calibration glyphs 410 and 412 received from AR headset system 404, gaming console 102 determines the location, size, and orientation of display monitor 408 with respect to the user 402. After initial calibration, gaming console 102 may continually update calibration data. To perform continual calibration, calibration glyphs 410 and 412 or other suitable glyphs may be encoded into the images displayed on display monitor 408 at regular intervals. Calibration glyphs 410 and 412 could be encoded as watermarks in the game images rendered by gaming console 102 so that the user 402 is unable to detect that calibration glyphs 410 and 412 are included in the display image.

Additionally or alternatively, gaming console 102 may perform initial calibration by tracking the location and/or orientation of game controller 406. Gaming console 102 displays an image to place game controller 406 at a first fixed location of display monitor 408, such as the upper left corner of display monitor 408, and activate a button on game controller 406. Game controller 406 then transmits the location and/or orientation of game controller 406 to gaming console 102. Gaming console 102 then displays an image to place game controller 406 at a second fixed location of display monitor 408, such as the lower right corner of display monitor 408, and activate a button on game controller 406. Game controller 406 then transmits the location and/or orientation of game controller 406 to gaming console 102. Based on these two locations and/or orientations, gaming console 102 determines the location, size, and orientation of display monitor 408.

Additionally or alternatively, AR headset system 404 and/or gaming console 102 may include simultaneous localization and mapping (SLAM) capability. Via SLAM technology, gaming console 102 continually receives updated information from AR headset system 404 regarding the location, size, and orientation of display monitor 408 with respect to the user 402.

Additionally or alternatively, gaming console 102 may determine the location, size, and orientation of display monitor 408 via a beacon (not explicitly shown). A beacon establishes a fixed position in 3D space as an anchor for the AR objects displayed in 3D space. In general, a beacon is a device that provides an anchor point to a particular point within the physical environment of the user. The beacon transmits location information to gaming console 102 and/or AR headset system 404 over any technically feasible wired or wireless communications link. Via this location information, gaming console 102 and/or AR headset system 404 track and anchor computer-generated virtual objects relative to the location of the beacon.

Figure 5:
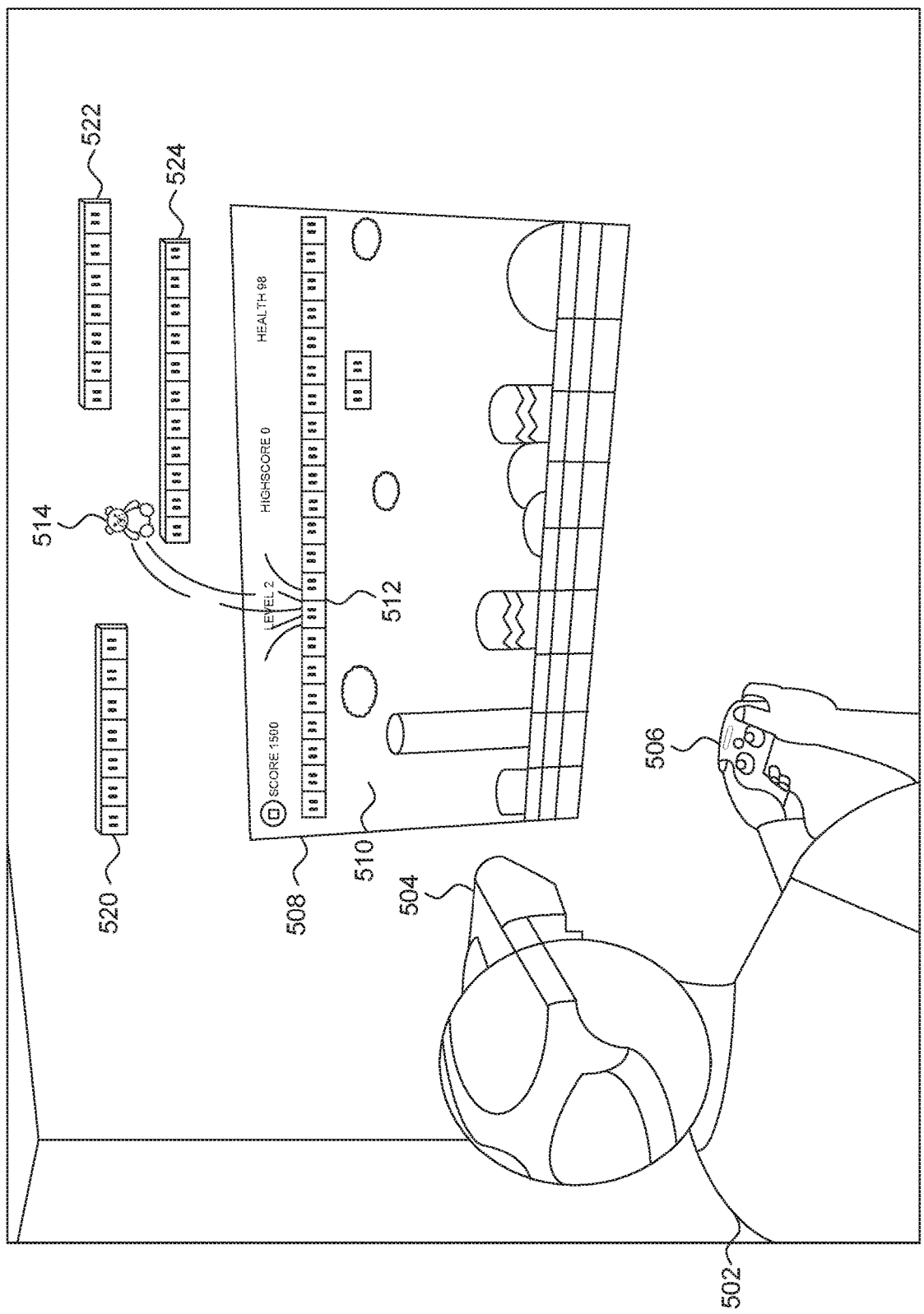
FIG. 5 illustrates an exemplary computer game generated by the system of FIG. 1, according to various embodiments of the present invention.

FIG. 5 illustrates an exemplary computer game generated by the system 100 of FIG. 1, according to various embodiments of the present invention. As shown, a user 502 views a display monitor 508 while wearing an AR headset system 504 and holding a game controller 506. The display monitor 508 displays an image 510 of an on-screen video game.

The user 502 manipulates game controller 506 to move a character from a first position 512 within the bounds of display monitor 508 to a second position 514 above display monitor 508. In response, AR headset system 504 renders and displays the character 512 as an AR object that appears above display monitor 508. Additionally, AR headset system 504 renders and displays additional game tiles 520, 522, and 524 as AR objects that appear above display monitor 508. Additionally or alternatively, AR headset system 504 may render and display additional AR objects to the left or right of display monitor 508 and/or below display monitor 508. Additionally or alternatively, AR headset system 504 may render and display additional AR objects on other walls within the physical environment, such as walls to the left or right of the user 502 and/or behind the user 502. In this manner, the user 502 plays the game via virtual objects displayed on various walls in the physical environment in addition to playing the game via display monitor 508.

In some embodiments, gaming console 102 renders and displays other additional elements that lead to hidden objects outside of the bounds of display monitor 508. In one example, display monitor 508 could show a portion of a vine that appears to grow vertically out of the top of display monitor 508. The user 502 could manipulate game controller 506 and/or AR headset system 504 to move character 512 in position to climb the vine. As the character 512 exits the top of display screen 508, AR headset system 504 could render the character 512 and a portion of the vine as AR objects that the user 502 sees above display monitor 508.

In another example, display monitor 508 could show a portion of a pipe that appears to end at the left or right of display monitor 508. The user 502 could manipulate game controller 506 and/or AR headset system 504 to move character 512 in position to crawl along the pipe. As the character 512 exits the left or right of display screen 508, AR headset system 504 could render the character 512 and a portion of the pipe as AR objects that the user 502 sees to the left or right of display monitor 508.

Figure 6:
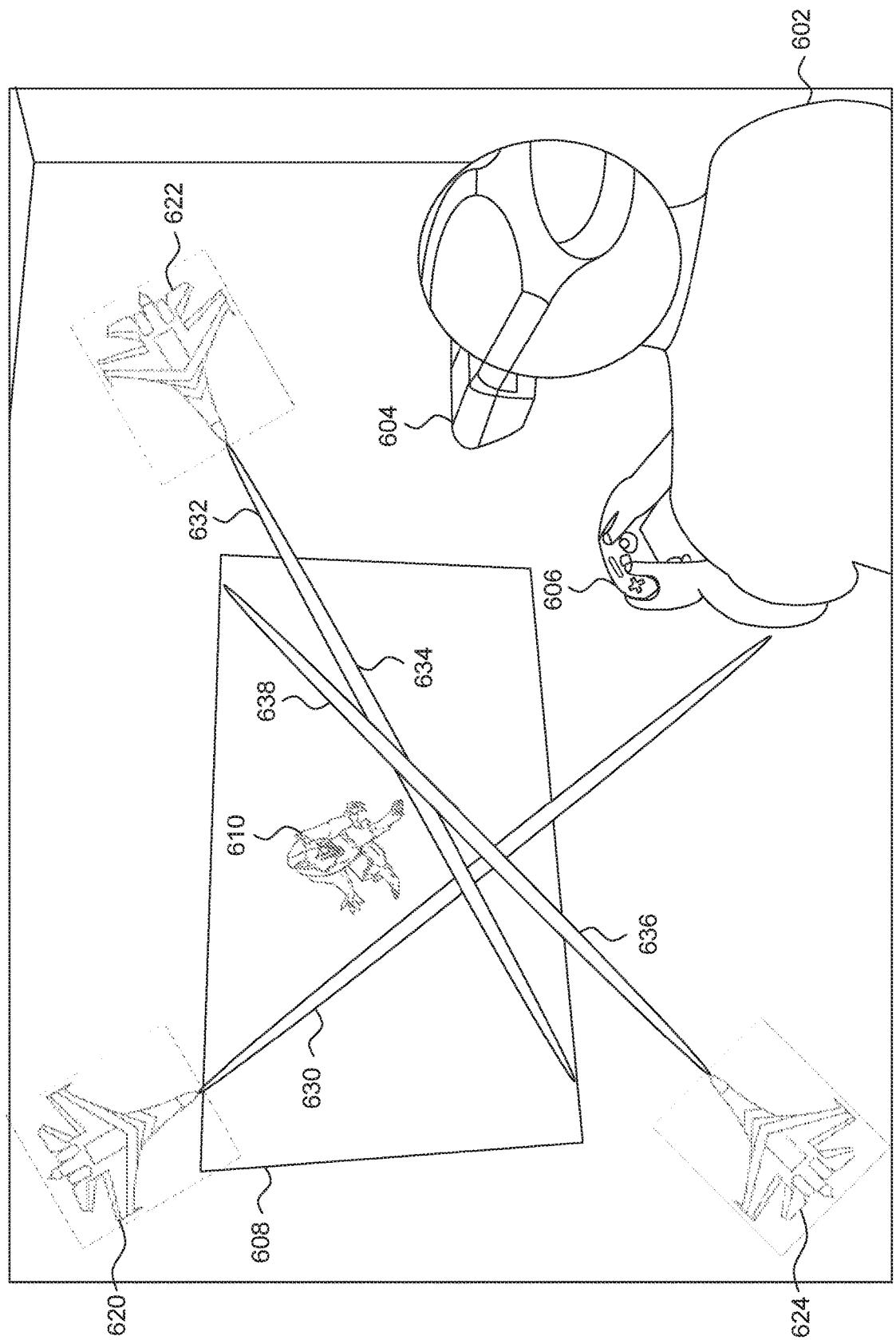
FIG. 6 illustrates another exemplary computer game generated by the system of FIG. 1, according to various other embodiments of the present invention.

FIG. 6 illustrates another exemplary computer game generated by the system 100 of FIG. 1, according to various embodiments of the present invention. As shown, a user 602 views a display monitor 608 while wearing an AR headset system 604 and holding a game controller 606. The display monitor 608 displays an image of an on-screen video game.

The user 606 manipulates game controller 606 to guide starship 610 during gameplay. Enemy starships 620, 622, and 624 fire laser weapons directed at the user 602 and/or at starship 610. The user 606 manipulates game controller 606 so that starship 610 avoids being hit by the laser beams from the laser weapons that enter the bounds of display monitor 608. Further, the user 606 may physically move within the physical environment to avoid being hit by the laser weapons.

AR headset system 604 renders and displays enemy starships 620, 622, and 624. AR headset system 604 further renders and displays AR objects related to the portion of the laser beams fired by the laser weapons of enemy starships 620, 622, and 624 that appear in 3D space. Similarly, gaming console 102 renders and displays the portion of the laser beams fired by the laser weapons of enemy starships 620, 622, and 624 that enter the bounds of display monitor 608. More specifically, the laser beam 630 fired by enemy starship 620 does not enter the bounds of display monitor 608. Therefore, AR headset system 604 renders the entirety of laser beam 630 as an AR object. By contrast, the laser beam fired by enemy starship 622 enters the bounds of display monitor 608. Therefore, AR headset system 604 renders the portion of laser beam 632 that appears in 3D space as an AR object. Gaming console 102 renders and displays the portion of laser beam 634 that enters the bounds of display monitor 608 on display monitor 608. Similarly, the laser beam fired by enemy starship 624 enters the bounds of display monitor 608. Therefore, AR headset system 604 renders the portion of laser beam 636 that appears in 3D space as an AR object. Gaming console 102 renders and displays the portion of laser beam 638 that enters the bounds of display monitor 608 on display monitor 608.

Figure 7:
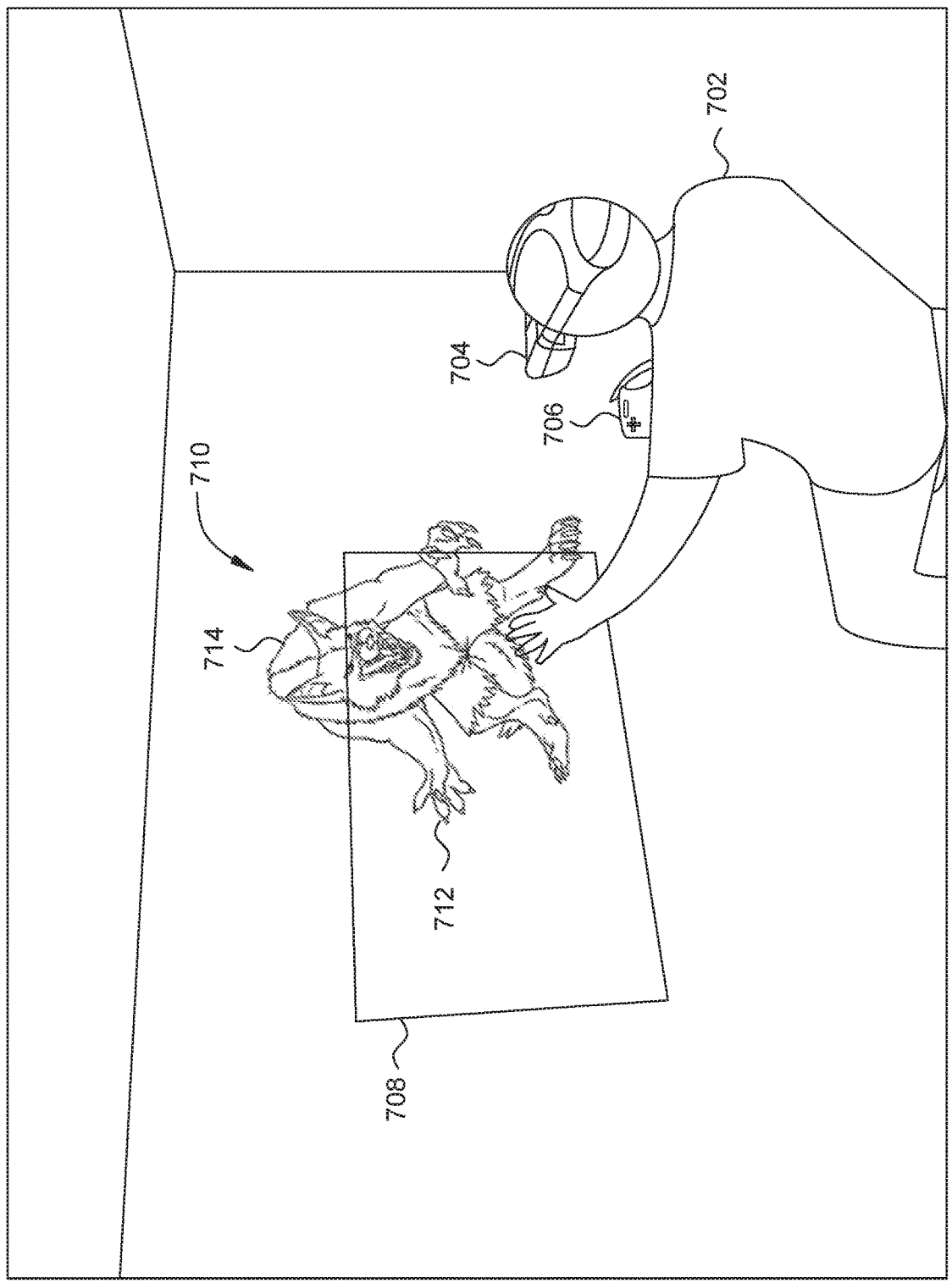
FIG. 7 illustrates yet another exemplary computer game generated by the system of FIG. 1, according to various other embodiments of the present invention.

FIG. 7 illustrates yet another exemplary computer game generated by the system 100 of FIG. 1, according to various other embodiments of the present invention. As shown, a user 702 views a display monitor 708 while wearing an AR headset system 704 and holding a game controller 706. The display monitor 708 displays an image of an on-screen video game.

Via an event within the executing game, control inputs received from AR headset system 704, and/or control inputs received from game controller 706, gaming console 102 determines that a character 710 is about to leave the bounds of display monitor 708 and lunge at the user 702. After the character 710 leaves the bounds of display monitor 708 completely, gaming console 102 terminates operations related to rendering and displaying the character 710, and AR headset system 704 renders and displays the character 710 as an AR object. During the transition phase as the character 710 is in the process of leaving the bounds of display monitor 708, gaming console 102 determines the portion 712 of the character 710 that is still within the bounds of display monitor 708 and the portion 714 of the character 710 that appears in 3D space. Gaming console 102 renders and displays the portion 712 of the character 710 that is still within the bounds of display monitor 708 as part of the image on display monitor 708. Gaming console 102 transmits position data, orientation data, and other information related to the portion 714 of the character 710 that appears in 3D space to AR headset system 704. In response, AR headset system 704 renders and displays the portion 714 of the character 710 that appears in 3D space as an AR object. In some embodiments, gaming console 102 and/or AR headset system 704 renders other objects, such as flying particles of glass or other material, so that the character 710 appears to exit a portal or window defined by display monitor 708 into the physical environment of the user 702.

Figure 8A:
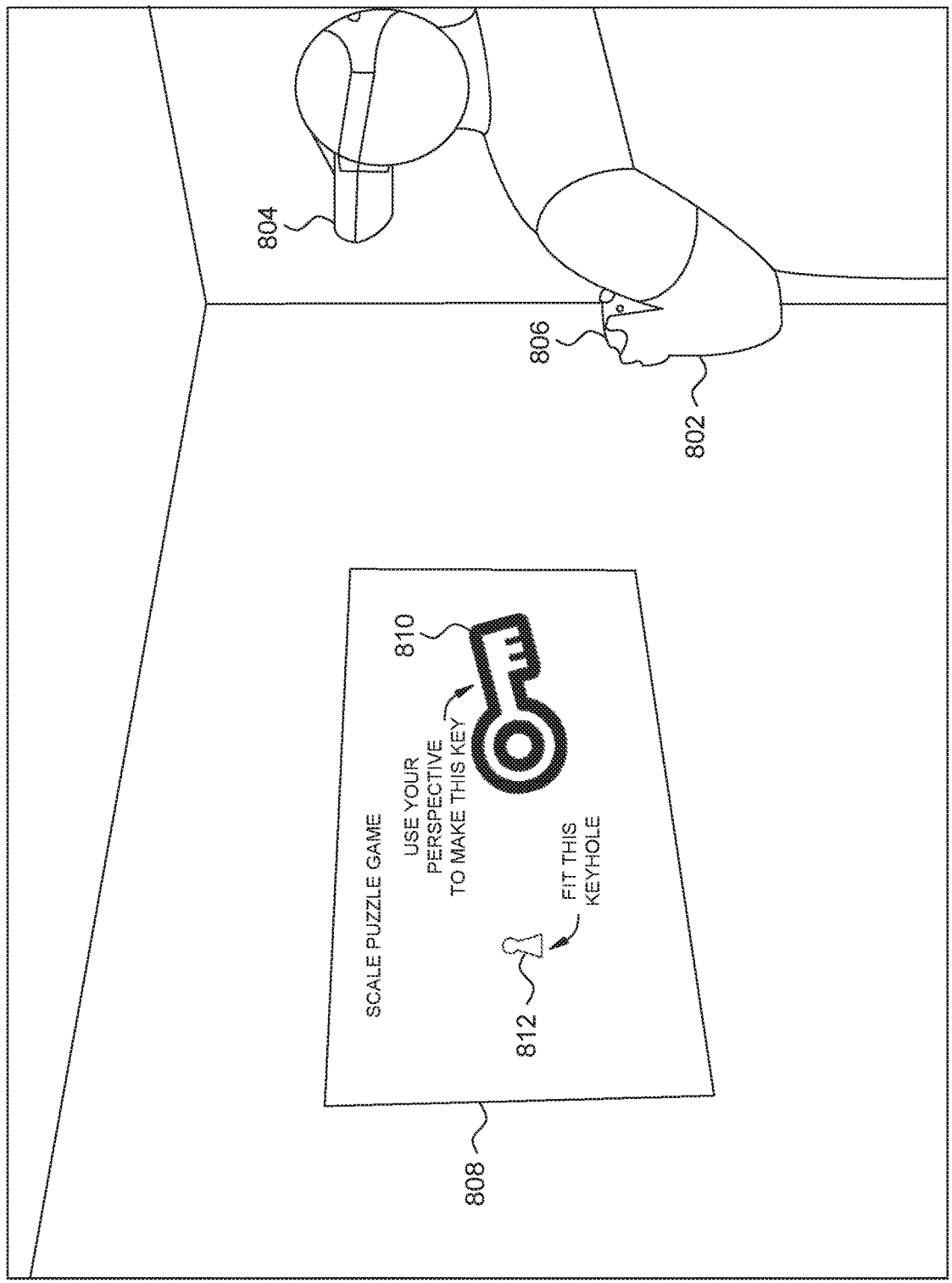
FIGS. 8A-8C illustrate another exemplary computer game generated by the system of FIG. 1, according to various other embodiments of the present invention.
Figure 8B:
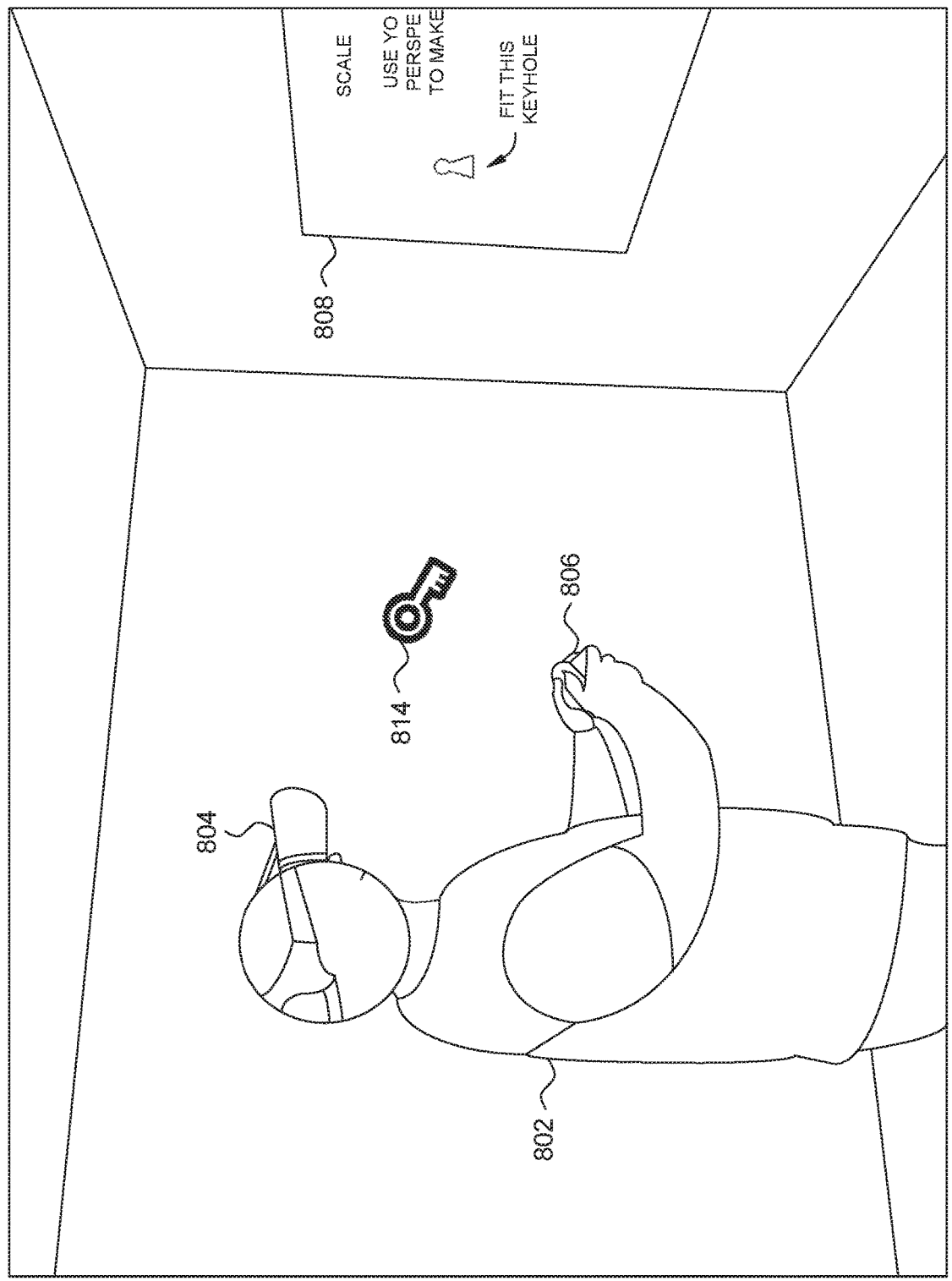
Figure 8C:
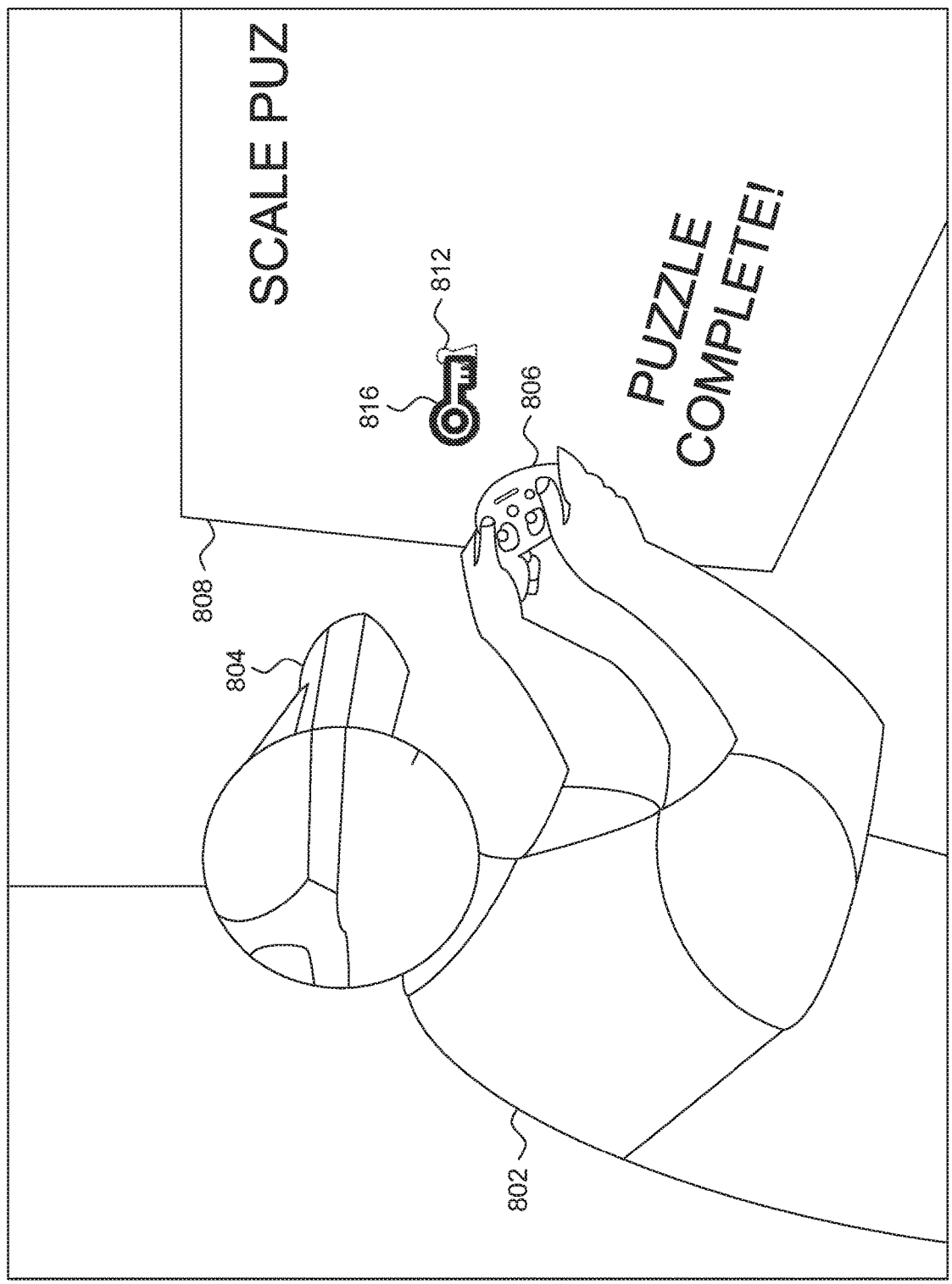

FIGS. 8A-8C illustrate another exemplary computer game generated by the system 100 of FIG. 1, according to various other embodiments of the present invention.

As shown in FIG. 8A, a user 802 views a display monitor 808 while wearing an AR headset system 804 and holding a game controller 806. The display monitor 808 displays an image of an on-screen video game. The on-screen video game includes a scale puzzle where the user 802 is tasked with placing a key 810 into a keyhole 812 to complete the current phase of the on-screen video game. As shown in the image displayed on display monitor 808, the key 810 is too large and is in the wrong orientation to fit into the keyhole 812.

As shown in FIG. 8B, the user 802 "grabs" the key 814 from display monitor 808 via game controller 806 and "pulls" the key 814 into 3D space. Gaming console 102 terminates operations related to rendering and displaying an image of the key 814 on display monitor 808. Gaming console 102 transmits location data, orientation data, and other information related to the key 814 to AR headset system 804. In response, AR headset system 804 displays the key 814 as an AR object in 3D space.

As shown in FIG. 8C, the user 802 manipulates his or her body, and/or manipulates the controls of game controller 806 to change the size, location, and orientation of the key 816. During this process, gaming console 102 continually transmits updated location data, orientation data, and other information related to the key 816 to AR headset system 804. In response, AR headset system 804 displays updated versions of the key 816 as an AR object in 3D space. When the key 816 is at the correct size, location, and orientation, the user 802 manipulates his or her body, and/or manipulates the controls of game controller 806 to insert the key 816 into the keyhole 812. Once gaming console 102 determines that the user 802 has inserted the key 816 into the keyhole 812 with the correct size, location, and orientation, the gaming console 102 determines that the user 802 has completed the puzzle.

Figure 9A:
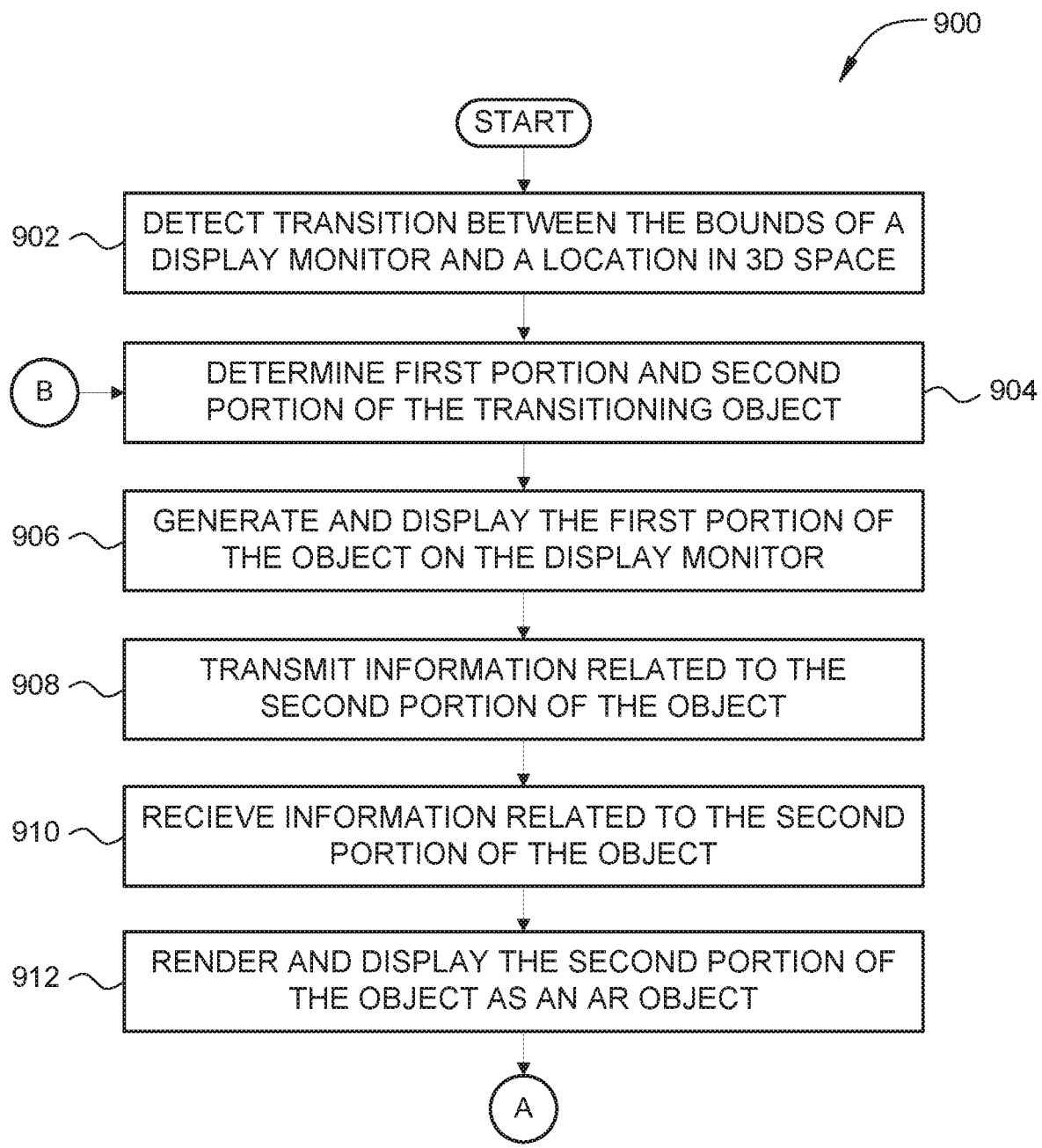
FIGS. 9A-9C set forth a flow diagram of method steps for extending on-screen gameplay via an augmented reality system, according to various embodiments of the present invention.
Figure 9B:
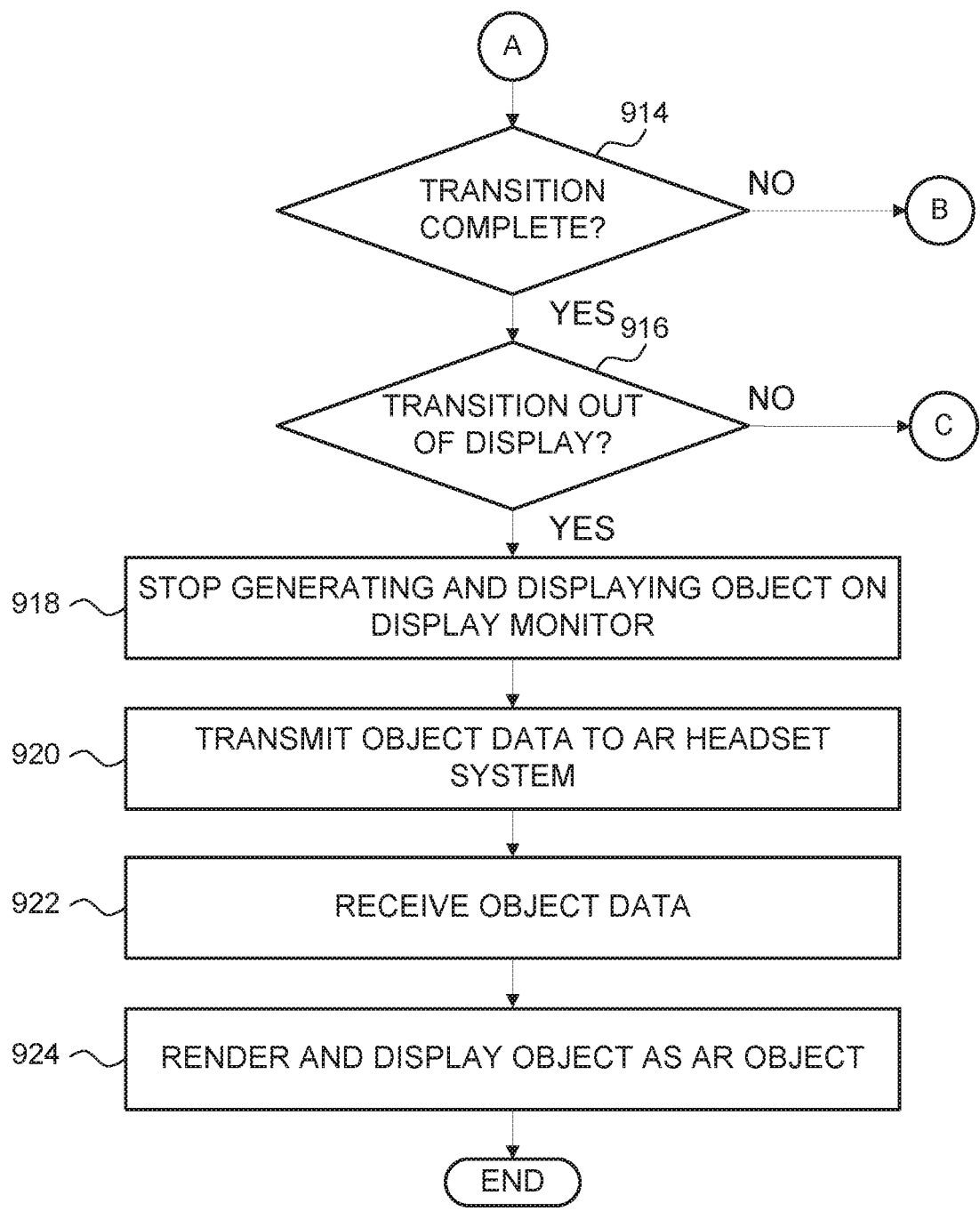
Figure 9C:
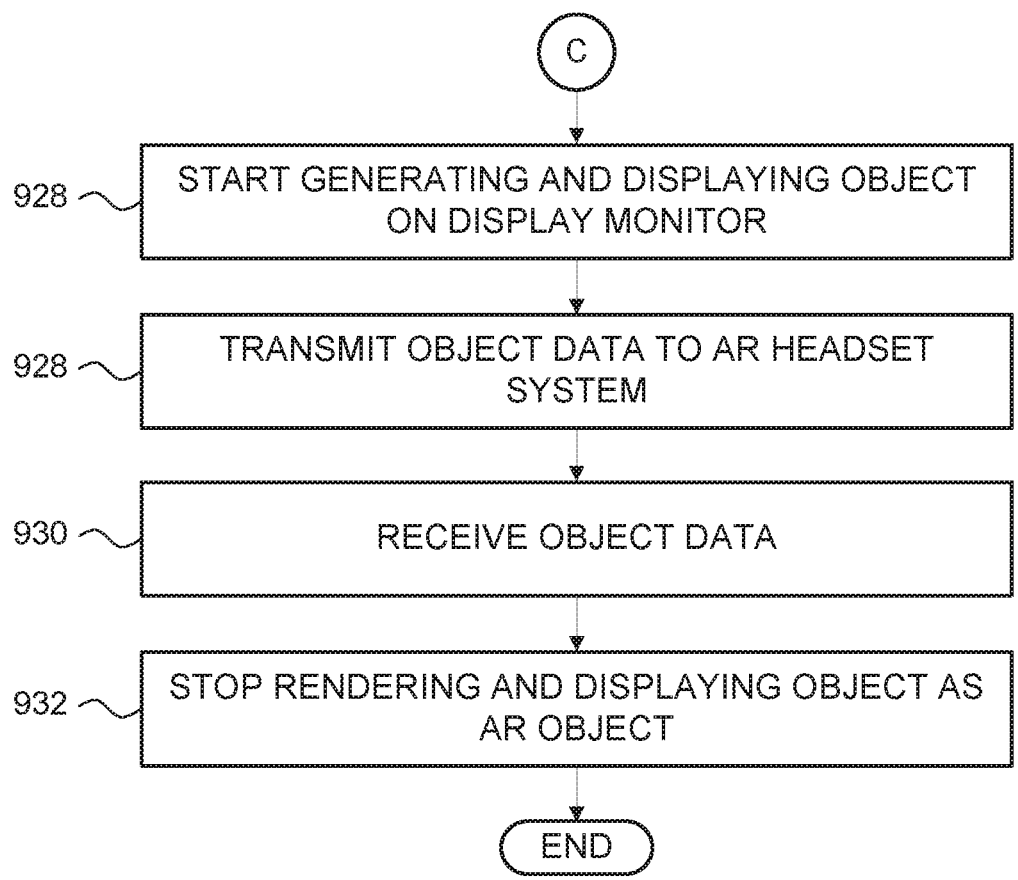

FIGS. 9A-9C set forth a flow diagram of method steps for extending on-screen gameplay via an augmented reality system, according to various embodiments of the present invention. Although the method steps are described in conjunction with the systems of FIGS. 1-8C, persons of ordinary skill in the art will understand that any system configured to perform the method steps, in any order, is within the scope of the present invention.

As shown, a method 900 begins at step 902, where extended gaming application 232 executing on gaming console 102 determines that an object is transitioning between the bounds of a display monitor and a location in 3D space in a physical environment. The object could be transitioning from being displayed on the display monitor to being displayed as an AR object in 3D space. Alternatively, the object could be transitioning from being displayed as an AR object in 3D space to being displayed on the display monitor.

At step 904, extended gaming application 232 determines a first portion of the object that is within the bounds of the display monitor and a second portion of the object that is not within the bounds of the display monitor. At step 906, extended gaming application 232 renders and displays the first portion of the object that is within the bounds of the display monitor on the display monitor. At step 908, extended gaming application 232 transmits position data, orientation data, and other information related to the second portion of the object to extended AR application 332.

At step 910, extended AR application 332 executing on AR headset system 104 receives the position data, orientation data, and other information related to the second portion of the object from extended gaming application 232. At step 912, extended AR application 332 renders and displays the second portion of the object as an AR object.

At step 914, extended gaming application 232 determines whether the transition of the object between the bounds of a display monitor and the location in 3D space in the physical environment is complete. If, the transition of the object is not complete, then the method proceeds to step 904, described above. If, however, the transition of the object is complete, then the method proceeds to step 916, where extended gaming application 232 determines whether the object is transitioning from within the bounds of the display monitor to outside the bounds of the display monitor. If the object is transitioning from within the bounds of the display monitor to outside the bounds of the display monitor, then the method 900 proceeds to step 918, where extended gaming application 232 terminates operations related to rendering and displaying the object on the image displayed on the display monitor. At step 920, extended gaming application 232 transmits position data, orientation data, and other information related to the object to extended AR application 332. At step 922, extended AR application 332 receives the position data, orientation data, and other information related to the object from extended gaming application 232. At step 924, extended AR application 332 renders the object as an AR object. The method 900 then terminates.

Returning to step 916, if the object is not transitioning from within the bounds of the display monitor to outside the bounds of the display monitor, then the object is transitioning from outside the bounds of the display monitor to within the bounds of the display monitor. In such cases, the method 900 proceeds to step 926, where extended gaming application 232 renders and displays the object on the image displayed on the display monitor. At step 928, extended gaming application 232 transmits position data, orientation data, and other information related to the object to extended AR application 332. At step 930, extended AR application 332 receives the position data, orientation data, and other information related to the object from extended gaming application 232. At step 932, extended AR application 332 terminates operations related to rendering the object as an AR object. The method 900 then terminates.

In sum, techniques are disclosed for generating an extended on-screen gameplay experience via augmented reality. The disclosed techniques merge conventional on-screen-based gameplay with AR to generate new immersive forms of gameplay. More specifically, the disclosed techniques combine gameplay within a conventional display monitor with an augmented reality headset system that displays AR objects via an AR headset, a projection system, a mobile device such as a smartphone or tablet, or any other AR headset system. The user plays a game on a 2D display using a game controller and wearing an augmented reality headset system, or employing any other type of AR system. At times, the game is constrained to the bounds of the display monitor. At various points in the game, one or more objects transition between being displayed on the display monitor and being displayed as an AR object by the AR headset system. During the transition phase, the gaming console determines the portion of the object that is within the bounds of the display monitor and the portion of the object that is outside the bounds of the display monitor. The gaming console renders and displays the portion of the object that is within the bounds of the display monitor on the display monitor. The gaming console transmits position data, orientation data, and other information related to the portion of the object that is outside the bounds of the display monitor to the AR headset system. The AR headset system renders and displays the portion of the object that is outside the bounds of the display monitor as an AR object. In this manner, the AR headset system tracks 2D objects that transition from being displayed on the display monitor into being displayed in 3D physical space. The AR headset system continuously retrieves game state information related to game play from the gaming console and determines a physical coordinate for various game objects based on the size, aspect ratio, and position of the display screen.

At least one advantage of the disclosed techniques relative to the prior art is that a user experiences more realistic computer-generated gameplay because objects are displayed via traditional display monitor and additional 2D and 3D AR objects are displayed via a companion AR system. As a result, the user can have a more immersive overall experience with enhanced effects, such as the effect of objects displayed via the traditional display monitor appearing to come out of the display monitor into the physical environment of the user. Similarly, the AR objects displayed via the AR system and in the physical environment of the user can appear to enter into the display monitor. In effect, the user is able to play the computer game on the traditional display monitor as well as in the physical environment where the user is physically present, thereby creating a more fully immersive gameplay experience relative to the prior art.

These advantages represent one or more technological improvements over prior art approaches.

1. In some embodiments, a computer-implemented method for extending on-screen gameplay via an augmented reality system includes receiving, via a game controller, first data associated with a first object associated with a computer-generated game; rendering an augmented reality object based on the first data associated with the first object; and displaying at least a first portion of the augmented reality object via an augmented reality headset system, wherein an image associated with the computer-generated game is simultaneously rendered on a display monitor.

2. The computer-implemented method according to clause 1, wherein the image associated with the computer-generated game includes at least a second portion of the first object that is different than the first portion of the augmented reality object.

3. The computer-implemented method according to clause 1 or clause 2, further comprising: receiving an indication that the first object is displayed fully within the display monitor; and in response, terminating operations related to rendering and displaying the first portion of the augmented reality object via the augmented reality headset system.

4. The computer-implemented method according to any of clauses 1-3, further comprising: receiving an indication that no portion of the first object is being displayed within the display monitor; and displaying fully the augmented reality object via the augmented reality headset system.

5. The computer-implemented method according to any of clauses 1-4, further comprising: receiving, via the game controller, second data associated with the first object; rendering the augmented reality object based on the second data associated with the first object; and displaying at least a second portion of the augmented reality object via the augmented reality headset system.

6. The computer-implemented method according to any of clauses 1-5, wherein the data associated with the first object is based on data received from the augmented reality headset system.

7. The computer-implemented method according to any of clauses 1-6, wherein the data associated with the first object is based on data received from the game controller.

8. The computer-implemented method according to any of clauses 1-7, further comprising: tracking at least one of a location and an orientation of the augmented reality headset system; and transmitting the at least one of the location and the orientation to the gaming console.

9. The computer-implemented method according to any of clauses 1-8, further comprising: tracking at least one of a location and an orientation of a second object included in an image captured by a camera associated with the augmented reality headset system; and transmitting the at least one of the location and the orientation to the gaming console.

10. In some embodiments, a non-transitory computer-readable medium includes instructions that, when executed by a processor, cause the processor to perform the steps of: receiving first data associated with a first object associated with a computer-generated game; rendering an augmented reality object based on the first data associated with the first object; and displaying at least a first portion of the augmented reality object via an augmented reality headset system, wherein a first image associated with the computer-generated game is simultaneously rendered on a display monitor.

11. The non-transitory computer-readable medium according to clause 10, wherein the first image associated with the computer-generated game includes at least a second portion of the first object that is different than the first portion of the augmented reality object.

12. The non-transitory computer-readable medium according to clause 10 or clause 11, further comprising: receiving an indication that the first object is displayed fully within the display monitor; and in response, terminating operations related to rendering and displaying the first portion of the augmented reality object via the augmented reality headset system.

13. The non-transitory computer-readable medium according to any of clauses 10-12, further comprising: receiving an indication that no portion of the first object is being displayed within the display monitor; and displaying fully the augmented reality object via the augmented reality headset system.

14. The non-transitory computer-readable medium according to any of clauses 10-13, further comprising: receiving, via the game controller, second data associated with the first object; rendering the augmented reality object based on the second data associated with the first object; and displaying at least a second portion of the augmented reality object via the augmented reality headset system.

15. The non-transitory computer-readable medium according to any of clauses 10-14, further comprising: detecting a glyph included in a second image rendered on the display monitor; determining one or more of a size and a location of the glyph based on the second image; and in response, determining one or more of a size and a location of the display monitor.

16. The non-transitory computer-readable medium according to any of clauses 10-15, wherein a physical screen size of the display monitor is included as data encoded in the glyph, and further comprising decoding the data encoded in the glyph to determine the physical screen size of the display monitor.

17. The non-transitory computer-readable medium according to any of clauses 10-16, wherein an original size of the glyph is included as data encoded in the glyph, and further comprising decoding the data encoded in the glyph to determine the original size of the glyph.

18. In some embodiments, a system, includes: an augmented reality headset system, comprising: a memory that includes instructions, and a processor that is coupled to the memory and, when executing the instructions, is configured to: receive first data associated with a first object associated with a computer-generated game, render an augmented reality object based on the first data associated with the first object, and display at least a first portion of the augmented reality object via an augmented reality headset system; and a display monitor configured to simultaneously render an image associated with the computer-generated game.

19. The system according to clause 18, further comprising: a game controller configured to: detect one or more of a location and an orientation associated with the game controller; and transmit the first data associated with the first object to the augmented reality headset system, wherein the first data includes the one or more of a location and an orientation.

20. The system according to clause 18 or clause 19, further comprising: a game controller configured to: detect an activation of a control associated with the game controller; and transmit the first data associated with the first object to the augmented activation of a control reality headset system, wherein the first data includes an indication of the activation of the control.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for extending on-screen gameplay via an augmented reality system, the method comprising:
   receiving, via a game controller, first data associated with a first object associated with a computer-generated game;
   rendering an augmented reality object based on the first data associated with the first object; and
   displaying at least a first portion of the augmented reality object via an augmented reality headset system,
   wherein an image associated with the computer-generated game is simultaneously rendered on a display monitor in response to the first object transitioning from being located at a first location within the display of the augmented reality headset system to being located at a second location within the display of the augmented reality headset system, wherein the first location is outside a visible area of the display monitor, and the second location is inside the visible area of the display monitor, and wherein the image depicts at least a portion of the first object.

2. The computer-implemented method of claim 1, wherein the portion of the first object is different than the first portion of the augmented reality object.

3. The computer-implemented method of claim 2, further comprising:
   receiving an indication that the first object is displayed fully within the display monitor; and
   in response, terminating operations related to rendering and displaying the first portion of the augmented reality object via the augmented reality headset system.

4. The computer-implemented method of claim 2, further comprising:
   receiving an indication that no portion of the first object is being displayed within the display monitor; and
   displaying fully the augmented reality object via the augmented reality headset system.

5. The computer-implemented method of claim 1, further comprising:
   receiving, via the game controller, second data associated with the first object;
   rendering the augmented reality object based on the second data associated with the first object; and
   displaying at least a second portion of the augmented reality object via the augmented reality headset system.

6. The computer-implemented method of claim 1, wherein the first data associated with the first object is based on data received from the augmented reality headset system.

7. The computer-implemented method of claim 1, wherein the first data associated with the first object is based on data received from the game controller.

8. The computer-implemented method of claim 1, further comprising:
tracking at least one of a location and an orientation of the augmented reality headset system; and
transmitting the at least one of the location and the orientation to a gaming console.

9. The computer-implemented method of claim 1, further comprising:
tracking at least one of a location and an orientation of a second object included in an image captured by a camera associated with the augmented reality headset system; and
transmitting the at least one of the location and the orientation to a gaming console.

10. A non-transitory computer-readable medium including instructions that, when executed by a processor, cause the processor to perform the steps of:
receiving first data associated with a first object associated with a computer-generated game;
rendering an augmented reality object based on the first data associated with the first object; and
displaying at least a first portion of the augmented reality object via an augmented reality headset system,
wherein a first image associated with the computer-generated game is simultaneously rendered on a display monitor in response to the first object transitioning from being located at a first location within the display of the augmented reality headset system to being located at a second location within the display of the augmented reality headset system, wherein the first location is outside a visible area of the display monitor, and the second location is inside the visible area of the display monitor, and wherein the image depicts at least a portion of the first object.

11. The non-transitory computer-readable medium of claim 10, wherein the portion of the first object that is different than the first portion of the augmented reality object.

12. The non-transitory computer-readable medium of claim 11, further comprising:
receiving an indication that the first object is displayed fully within the display monitor; and
in response, terminating operations related to rendering and displaying the first portion of the augmented reality object via the augmented reality headset system.

13. The non-transitory computer-readable medium of claim 11, further comprising:
receiving an indication that no portion of the first object is being displayed within the display monitor; and
displaying fully the augmented reality object via the augmented reality headset system.

14. The non-transitory computer-readable medium of claim 10, further comprising:
receiving, via a game controller, second data associated with the first object;
rendering the augmented reality object based on the second data associated with the first object; and
displaying at least a second portion of the augmented reality object via the augmented reality headset system.

15. The non-transitory computer-readable medium of claim 10, further comprising:
detecting a glyph included in a second image rendered on the display monitor;
determining a size or a location of the glyph based on the second image; and
in response, determining a size or a location of the display monitor.

16. The non-transitory computer-readable medium of claim 15, wherein a physical screen size of the display monitor is included as data encoded in the glyph, and further comprising decoding the data encoded in the glyph to determine the physical screen size of the display monitor.

17. The non-transitory computer-readable medium of claim 15, wherein an original size of the glyph is included as data encoded in the glyph, and further comprising decoding the data encoded in the glyph to determine the original size of the glyph.

18. A system, comprising:
an augmented reality headset system, comprising:
a memory that includes instructions, and
a processor that is coupled to the memory and, when executing the instructions, is configured to:
receive first data associated with a first object associated with a computer-generated game,
render an augmented reality object based on the first data associated with the first object, and
display at least a first portion of the augmented reality object via the augmented reality headset system; and
a display monitor configured to simultaneously render an image associated with the computer-generated game in response to the first object transitioning from being located at a first location within the display of the augmented reality headset system to being located at a second location within the display of the augmented reality headset system, wherein the first location is outside a visible area of the display monitor, and the second location is inside the visible area of the display monitor, and wherein the image depicts at least a portion of the first object.

19. The system of claim 18, further comprising:
a game controller configured to:
detect a location or an orientation associated with the game controller; and
transmit the first data associated with the first object to the augmented reality headset system,
wherein the first data includes the location or the orientation associated with the game controller.

20. The system of claim 18, further comprising:
a game controller configured to:
detect an activation of a control associated with the game controller; and
transmit the first data associated with the first object to an augmented activation of a control reality headset system,
wherein the first data includes an indication of the activation of the control.

* * * * *